United States Patent
Hofmann et al.

(10) Patent No.: US 8,348,250 B2
(45) Date of Patent: Jan. 8, 2013

(54) PNEUMATICALLY DAMPING MOUNT

(75) Inventors: Manfred Hofmann, Hünfelden (DE); Arndt Graeve, Koblenz (DE)

(73) Assignee: Trelleborg Automotive Germany GmbH, Hoehr-Grenzhausen (DE)

( * ) Notice: Subject to any disclaimer, the term of this patent is extended or adjusted under 35 U.S.C. 154(b) by 0 days.

(21) Appl. No.: 12/558,621

(22) Filed: Sep. 14, 2009

(65) Prior Publication Data
US 2010/0025902 A1 Feb. 4, 2010

Related U.S. Application Data
(63) Continuation of application No. PCT/EP2008/052745, filed on Mar. 7, 2008.

(30) Foreign Application Priority Data
Mar. 12, 2007 (DE) .......................... 10 2007 012 158

(51) Int. Cl.
*F16F 9/02* (2006.01)
*F16F 15/08* (2006.01)

(52) U.S. Cl. ................................ 267/140.13; 267/64.11

(58) Field of Classification Search .................. 267/153, 267/140.13, 64.27, 64.11, 292–294
See application file for complete search history.

(56) References Cited

U.S. PATENT DOCUMENTS

| | | | | |
|---|---|---|---|---|
| 3,323,786 A | * | 6/1967 | Boschi | 267/292 |
| 4,407,491 A | * | 10/1983 | Kunihiro et al. | 267/140.13 |
| 4,564,177 A | * | 1/1986 | Leonard | 267/64.24 |
| 6,199,837 B1 | * | 3/2001 | Leonard et al. | 267/64.27 |

FOREIGN PATENT DOCUMENTS

| | | |
|---|---|---|
| DE | 19952638 A1 | 4/2001 |
| DE | 102004008401 A1 | 9/2005 |
| FR | 1492211 A1 * | 8/1967 |
| JP | 57160716 A | 10/1982 |
| JP | 59031360 A | 2/1984 |
| JP | 91707636 A | 6/1997 |

OTHER PUBLICATIONS

International Search Report dated Jun. 13, 2008.

* cited by examiner

*Primary Examiner* — Robert A Siconolfi
*Assistant Examiner* — Anna Momper
(74) *Attorney, Agent, or Firm* — Laurence A. Greenberg; Werner H. Stemer; Ralph E. Locher

(57) ABSTRACT

A pneumatically damping mount, in particular an engine mount for motor vehicles, includes a bearing spring of elastomeric material for supporting a mount core and delimiting a working chamber. The working chamber is filled with a gas, in particular air, and communicates with the ambient atmosphere through a nozzle opening. A progression element of elastomeric material is disposed opposite the bearing spring and delimits the working chamber together with the bearing spring, to enable further deformation of the mount after closing of the working chamber.

14 Claims, 4 Drawing Sheets

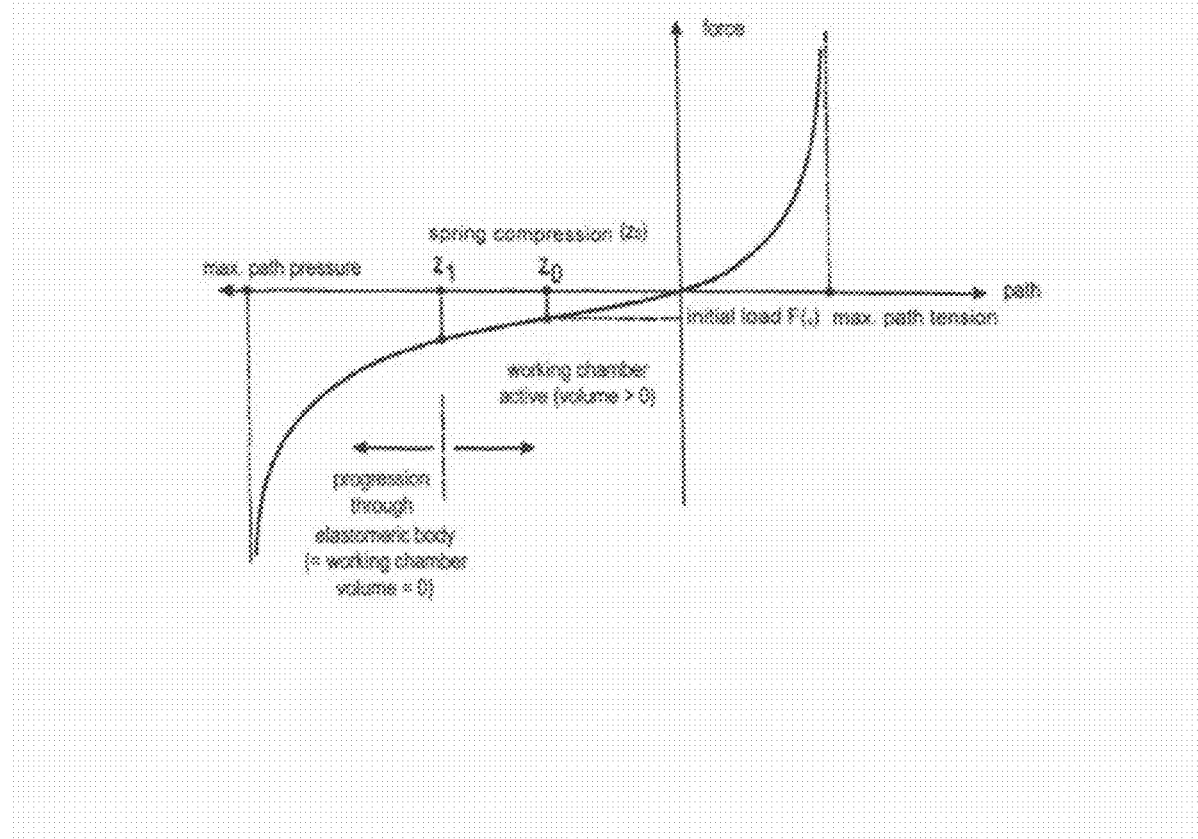

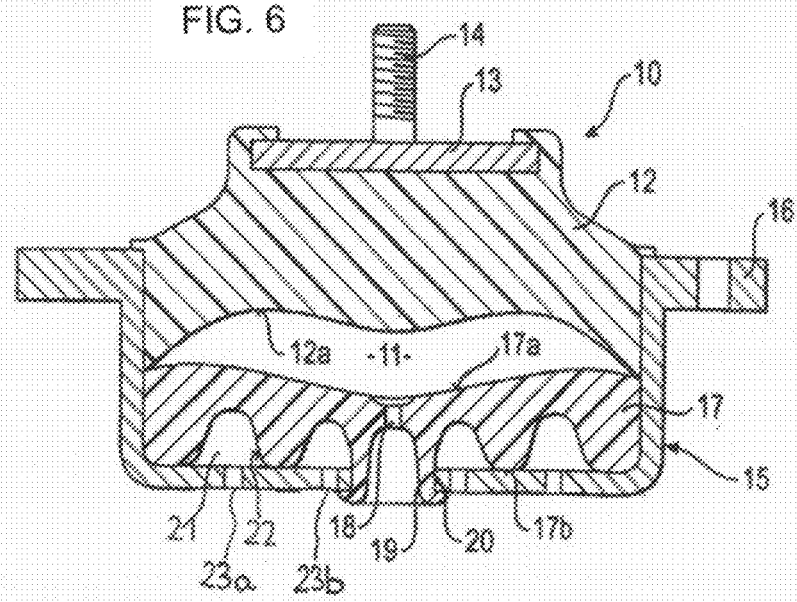

PNEUMATICALLY DAMPING MOUNT

CROSS-REFERENCE TO RELATED APPLICATION

This is a continuation, under 35 U.S.C. §120, of copending International Application No. PCT/EP2008/052745, filed Mar. 7, 2008, which designated the United States; this application also claims the priority, under 35 U.S.C. §119, of German Patent Application DE 10 2007 012 158.1, filed Mar. 12, 2007; the prior applications are herewith incorporated by reference in their entirety.

BACKGROUND OF THE INVENTION

Field of the Invention

The present invention relates to a pneumatically damping mount, in particular an engine mount for motor vehicles, including a bearing spring of elastomeric material supporting a mount core and delimiting a working chamber. The working chamber is filled with a gas, in particular air, and is in communication with the ambient atmosphere or surroundings or with another chamber, through a nozzle opening.

Such a pneumatically damping mount is known from German Published, Non-Prosecuted Patent Application DE 10 2004 008 401 A1. The bearing spring thereof has a broad, flat cross-sectional shape to achieve a small volume of the working chamber with a pump cross-section which is as large as possible.

An air spring mount is known from German Published, Non-Prosecuted Patent Application DE 199 52 638 A1, in which the working chamber is delimited by the bearing spring on one hand and by a damper plate on the other hand. A foam layer is applied to the damper plate over its whole surface and is bonded thereto. The foam layer serves to decouple interfering vibrations of small amplitudes. A nozzle channel is provided in the damper plate for communication between the working chamber and the ambient atmosphere.

Engine mounts must fulfill a load-path characteristic in order to achieve optimum isolation even under certain stresses. That means that the bearing spring should enable a large deformation. However, that requirement does not allow optimum use of the air damping since its volume would then be too large.

SUMMARY OF THE INVENTION

It is accordingly an object of the invention to provide a pneumatically damping mount, which overcomes the hereinafore-mentioned disadvantages of the heretofore-known devices of this general type.

With the foregoing and other objects in view there is provided, in accordance with the invention, a pneumatically damping mount, comprising a cup-shaped housing having venting bores formed therein, a mount core, a bearing spring of elastomeric material disposed in the housing for supporting the mount core, and a progression element of elastomeric material disposed in the housing opposite the bearing spring. The progression element has a nozzle opening formed therein and a mounting flange formed integrally or in one-piece therewith for snap-fastening to the housing. A working chamber is filled with a gas and is delimited by the bearing spring and the progression element. The working chamber communicates through the nozzle opening with the surroundings or with another chamber. The progression element has a bottom side facing away from the working chamber. An air chamber is disposed in the vicinity of the venting bores and is delimited by the bottom side of the progression element and the housing.

In the mount according to the present invention, the required load-path characteristic is generated by the bearing spring and the progression element. If the bearing spring operates around its operating point, the working chamber is compressed between the progression element and the bearing spring. Since the progression element has sufficient volume-rigidity due to the elastomeric material used, there is a damping effect as the air is displaced through the nozzle opening provided in the progression element. With increasing, quasi-static loads, the working chamber volume is reduced until it is completely closed and the bottom surface of the bearing spring completely abuts on the top surface of the progression element. If further force is applied, the progression element is elastically deformed. As the load is further increased, the quasi-static rigidity is increased until the maximum path has been traversed.

Increased yielding or flexibility of the progression element is achieved as it is deformed due to the at least one air chamber on the side of the progression element facing away from the working chamber.

The vent bores provided at the housing in the area of the air chamber facilitate venting of displaced air.

In accordance with another feature of the invention, the air chamber can advantageously include groove-like recesses formed into the progression element. The groove-like recesses can be formed in a rotation-symmetrical manner.

In accordance with a further feature of the invention, the air chamber is in communication with the working chamber through a nozzle opening. The nozzle opening acts as a pressure relief valve at high positive and negative pressures.

In accordance with an added feature of the invention, the progression element is formed as a one-piece cured part.

In accordance with an additional feature of the invention, the nozzle opening can be provided in the mounting area.

In accordance with a concomitant feature of the invention, the progression element is cured or adhesively bonded into the housing.

Other features which are considered as characteristic for the invention are set forth in the appended claims.

Although the invention is illustrated and described herein as embodied in a pneumatically damping mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 is a graph illustrating a load-path characteristic of a mount according to the present invention; and FIG. 6 is a vertical-sectional view of an embodiment of a mount according to the present invention having both venting bores and a mounting flange.

DETAILED DESCRIPTION OF THE INVENTION

Figure 1:
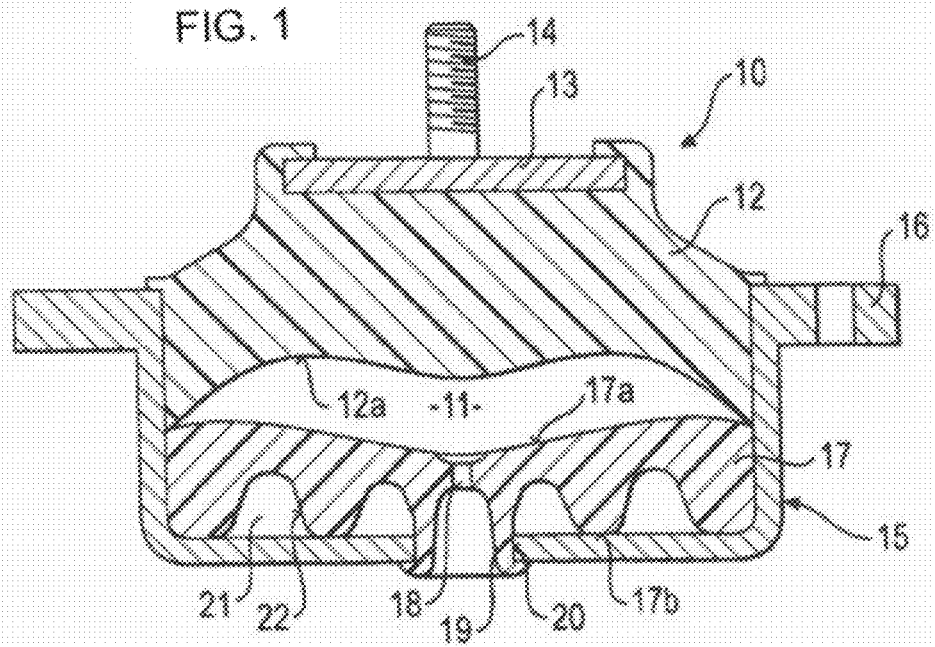
FIG. 1 is a diagrammatic, vertical-sectional view of a first embodiment of a mount according to the present invention.

Referring now to the figures of the drawings in detail and first, particularly, to FIG. 1 thereof, there is seen a pneumatically damping mount 10 which is used for mounting a non-illustrated engine of a motor vehicle. The mount 10 has a bearing spring 12 of an elastomeric material, in particular rubber. A mount core 13 including a vertically protruding bolt 14 for attachment on the engine, is cured into the bearing spring 12.

The bearing spring 12 is supported at its outer circumference on a cup-shaped housing 15 having a radially extending flange 16 for attachment on the vehicle body. The housing 15, which in the present case has a rotationally-symmetrical configuration, but which can basically also have a different cross-sectional shape, has an opening 20 in the center thereof. A progression element 17 of an elastomeric material, which has a mounting flange 19, is received in the housing 15. The mounting flange 19 is snapped into a housing opening 20 in order to attach the progression element 17.

The progression element 17 has a top surface 17a delimiting a working chamber 11 in combination with an inner surface 12a of the bearing spring 12 which is spaced apart therefrom. The working chamber 11, which is filled with air, is in communication with the surroundings or ambient atmosphere or with another chamber, through a nozzle opening 18 extending through the mounting flange 19.

The progression element 17, on its bottom surface 17b facing away from the working chamber 11, has an air chamber 21 formed by groove-like recesses 22. The air chamber 21 is provided for increasing the yielding or flexibility of the progression element 17 when pressure is applied to it.

The operation of the mount 10 will be described in the following with reference to the load-path characteristic shown in FIG. 5. Due to the static initial load supported by the bearing spring 12, a spring compression $z_0$ of the bearing spring 12 occurs. If the bearing spring 12 is operated around an operating point, the working chamber 11 is compressed between the progression element 17 and the bearing spring 12. Since the progression element 17 has sufficient volume-rigidity due to the elastomeric material used, a damping effect is created by the air displaced through the nozzle opening 18. As loads are increased in the pressure direction, the volume of the working chamber 11 is reduced until it becomes completely closed and the inner or bottom surface 12a of the bearing spring 12 abuts against the top surface 17a of the progression element 17. In the load-path characteristic, this springing effect is indicated as $z_1$. As further pressure is applied, the progression element 17 is compressed, wherein the quasi-static rigidity due to the air chamber 21 is increased until the maximum path has been traversed. The progression element 17 thus allows further deformation of the mount, after the working chamber 11 is closed.

Figure 2:
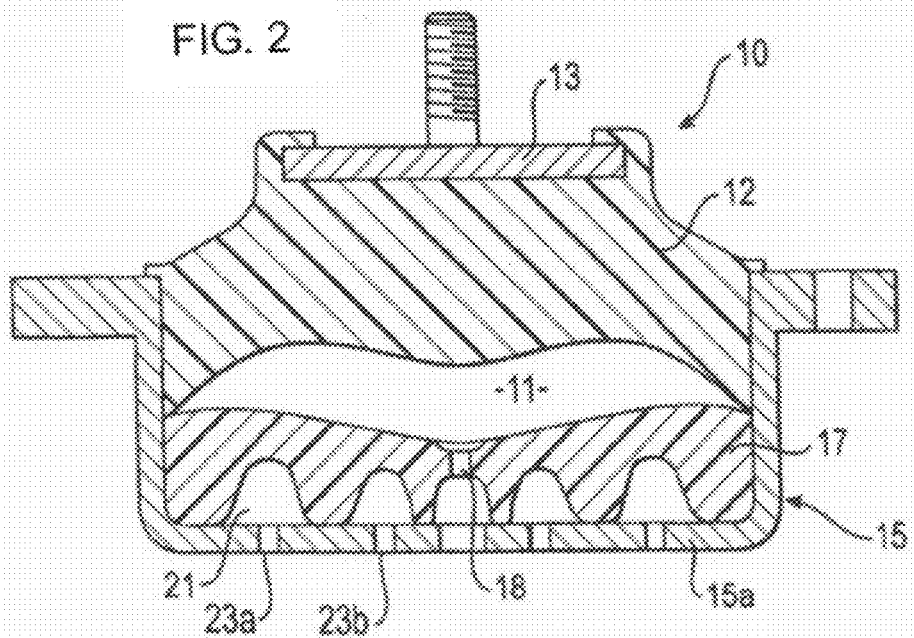
FIG. 2 is a vertical-sectional view of a second embodiment of a mount according to the present invention.
Figure 3:
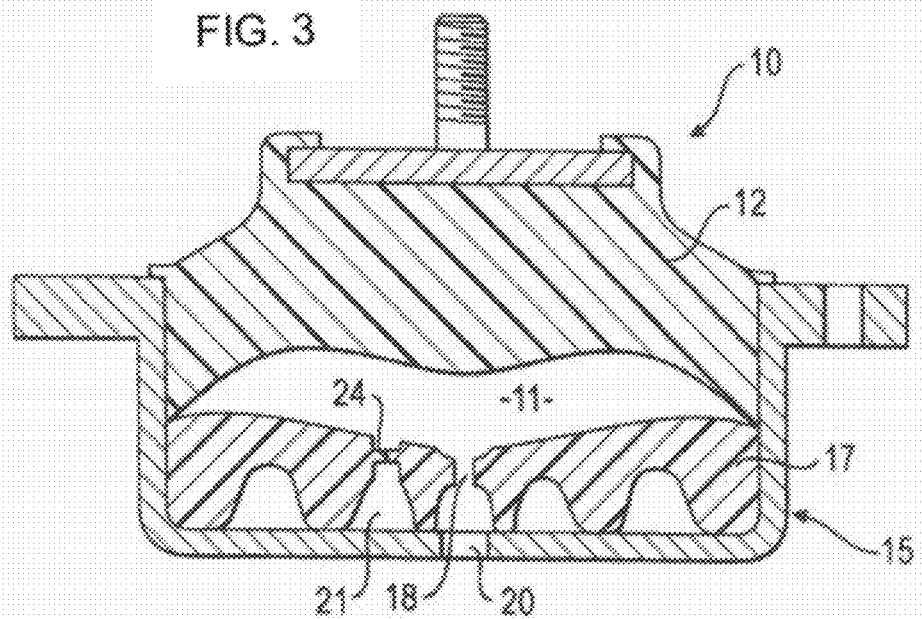
FIG. 3 is a vertical-sectional view of a third embodiment of a mount according to the present invention.
Figure 4:
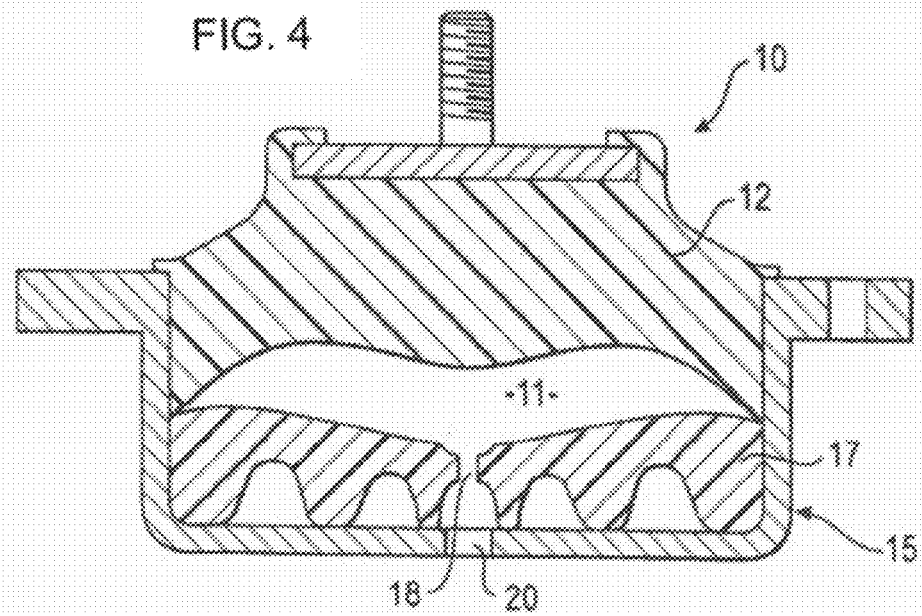
FIG. 4 is a vertical-sectional view of a fourth embodiment of a mount according to the present invention.

FIGS. 2 to 4 show further embodiments which will be described by using the already introduced reference numerals for the same or equivalent parts.

A pneumatically damping mount 10 shown in FIG. 2 has a progression element 17 received in a housing 15. This progression element 17 is attached to the housing 15 by bonding. A plurality of openings 23a, 23b are provided at the bottom 15a of the housing 15 for connecting an air chamber 21 of the progression element 17 with the surroundings or ambient atmosphere. A particularly high yielding or flexibility of the progression element 17 is thus achieved.

In a mount 10 shown in FIG. 3, a progression element 17 has an air chamber 21 which is in communication with a working chamber 11 through a nozzle opening 24. The nozzle opening 24 has the effect of a pressure relief valve at high positive and negative pressures.

FIG. 4 shows a further embodiment wherein a progression element 17 has a central nozzle opening 18 in communication with the housing opening 20. In this case, the nozzle opening is configured as a slotted membrane.

FIG. 6 shows an embodiment having both the mounting flange 19 of FIG. 1 and the openings 23a, 23b of FIG. 2.

All of the exemplary embodiments of the mount according to the present invention described above are distinguished in that, by using a progression element 17, further deformation of the mount 10 is facilitated after the working chamber 11 is closed. As the load is further increased, the quasi-static rigidity is thus increased until the maximum path has been traversed.

The invention claimed is:

1. A pneumatically damping mount, comprising:
 a cup-shaped housing having venting bores formed therein;
 a mount core;
 a bearing spring of elastomeric material disposed in said housing for supporting said mount core;
 a progression element of elastomeric material disposed in said housing opposite said bearing spring, said progression element having a nozzle opening formed therein and a mounting flange formed in one-piece therewith for snap-fastening to said housing, said nozzle opening being formed in said mounting flange;
 a working chamber filled with a gas and delimited by said bearing spring and said progression element, said working chamber communicating through said nozzle opening with the surroundings or with another chamber;
 said progression element having a bottom side facing away from said working chamber;
 an air chamber disposed in said progression element in vicinity of said venting bores, said air chamber delimited by said bottom side of said progression element and said housing; and
 said progression element being elastically deformable after said working chamber is closed, due to said bearing spring and said progression element coming to bear against each other, and said progression element having a rigidity being increased by compressing said progression element.

2. The mount according to claim 1, wherein the damping mount is an engine mount for motor vehicles.

3. The mount according to claim 1, wherein the gas filling said working chamber is air.

4. The mount according to claim 1, wherein said air chamber includes groove-shaped recesses formed into said progression element.

5. The mount according to claim 1, wherein said progression element is formed as a one-piece cured part.

6. The mount according to claim 1, wherein said progression element is cured or bonded into said housing.

7. The mount according to claim 1, wherein said progression element is configured to be elastically deformed by said bearing spring at loads higher than at an operating point.

8. A pneumatically damping mount, comprising:
a cup-shaped housing having venting bores formed therein;
a mount core;
a bearing spring of elastomeric material disposed in said housing for supporting said mount core;
a progression element of elastomeric material disposed in said housing opposite said bearing spring, said progression element having a nozzle opening formed therein and a mounting flange formed in one-piece therewith for snap-fastening to said housing;
a working chamber filled with a gas and delimited by said bearing spring and said progression element, said working chamber communicating through said nozzle opening with the surroundings or with another chamber;
said progression element having a bottom side facing away from said working chamber;
an air chamber disposed in said progression element in vicinity of said venting bores, said air chamber delimited by said bottom side of said progression element and said housing; and
said progression element being elastically deformable after said working chamber is closed, due to said bearing spring and said progression element coming to bear against each other, and said progression element having a rigidity being increased by compressing said progression element;
said bearing spring having an inner surface covering said nozzle opening when said working chamber is closed.

9. The mount according to claim 8, wherein the damping mount is an engine mount for motor vehicles.

10. The mount according to claim 8, wherein the gas filling said working chamber is air.

11. The mount according to claim 8, wherein said air chamber includes groove-shaped recesses formed into said progression element.

12. The mount according to claim 8, wherein said progression element is formed as a one-piece cured part.

13. The mount according to claim 8, wherein said progression element is cured or bonded into said housing.

14. The mount according to claim 8, wherein said progression element is configured to be elastically deformed by said bearing spring at loads higher than at an operating point.

* * * * *